3,614,860
SUCTION CLEANER
Karl Gustav Grellsson, Sollentuna, Sweden, assignor to Aktiebolaget Electrolux, Stockholm, Sweden
Filed Mar. 13, 1969, Ser. No. 807,777
Claims priority, application Sweden, Mar. 15, 1968, 3,400/68
Int. Cl. B01d 46/10
U.S. Cl. 55—276
2 Claims

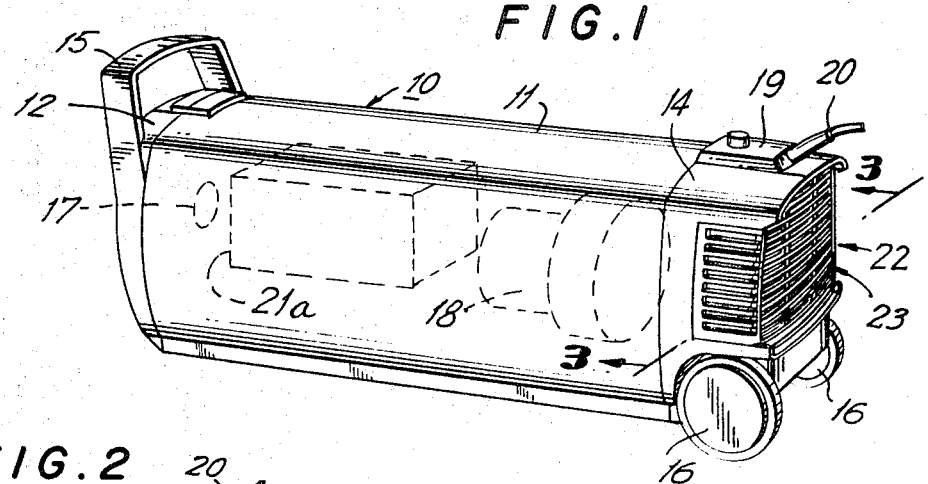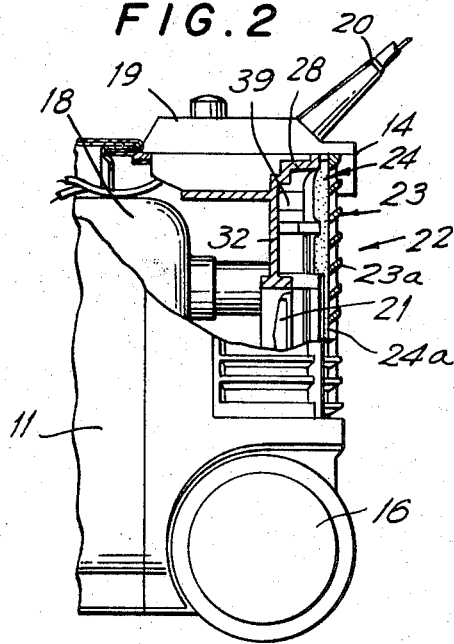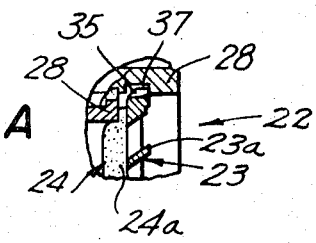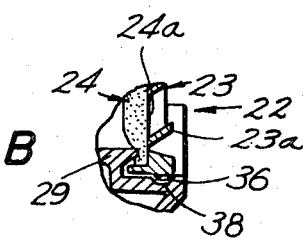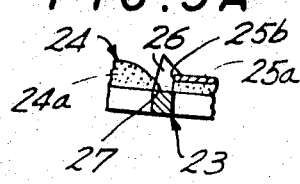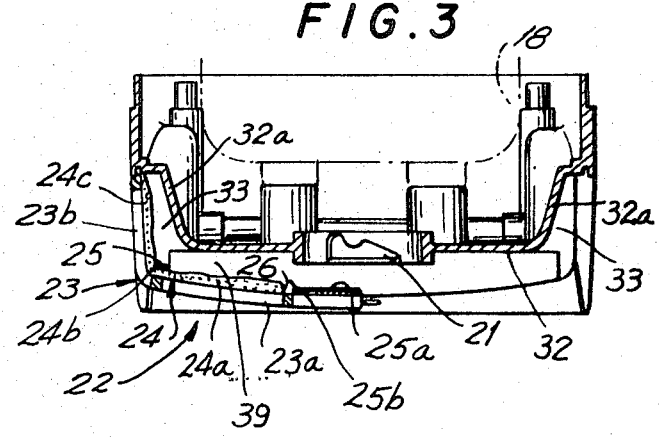

ABSTRACT OF THE DISCLOSURE

This invention relates to a suction cleaner having an elongated casing formed with an air inlet at one end and an air outlet in a transverse wall at its opposite end. A chamber, which is defined in part by the transverse wall and a combined filter and diffuser unit, receives air flowing from the air outlet. The combined filter and diffuser unit is U-shaped and has an end which extends transversely of the cleaner at the vicinity of the air outlet end thereof and spaced apart sides which extend at opposing sides of the cleaner from the closed end toward the transverse wall. The U-shaped filter and diffuser unit, which includes a U-shaped grate or apertured frame and a fine filter in the form of a layer of material positioned within the closed end and spaced apart sides of the grate, has a cross-sectional area greater than that of the air outlet and filters fine dust particles from air flowing into the chamber and diffuses and subdivides the filtered air into a multiplicity of tiny air streams which are deflected upward and discharged from the unit through a horizontal arc which extends transversely of the cleaner and along the opposing sides thereof.

BACKGROUND OF THE INVENTION

(1) Field of the invention

It is known to provide a fine filter at the air outlet end of a suction cleaner to remove fine dust particles from air before discharging the air from the suction cleaner. It also is known to employ in a suction cleaner a diffuser which receives air at a high velocity and diffuses and gently discharges such air in a multiplicity of directions without disturbing settled dust in an enclosure being cleaned. Further, it is known to deflect upward air discharged from the air outlet of a suction cleaner.

SUMMARY OF THE INVENTION

It is an object of the invention to provide for a horizontal tank-type suction cleaner an improved fine filter and diffuser unit which functions to remove fine dust particles from air and diffuses and subdivides the filtered air into a multiplicity of tiny air streams which are discharged from the unit through a horizontal arc which extends transversely of the cleaner and also along the opposing sides thereof.

Another object is to provide a combined filter and diffuser unit of this type which also functions to deflect air upward through the horizontal arc in which the tiny air streams are discharged gently from the outer surfaces of the unit.

A further object is to provide a combined filter and diffuser unit of this type which is U-shaped and includes a U-shaped grate or apertured frame having an end extending transversely of the cleaner and spaced arms extending from such end at the opposing sides of the cleaner and a U-shaped filter in the form of a layer of material which conforms to the shape of the grate and is disposed within the latter.

A still further object is to provide a combined filter and diffuser unit of this type which includes a member at the inner face of the layer of filter material to hold the outer face thereof against the grate or apertured frame.

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWING

FIG. 1 is a side perspective view of a tank-type suction cleaner embodying the invention;

FIG. 2 is a fragmentary side elevational view, partly broken away and in section, of the suction cleaner shown in FIG. 1;

FIG. 2A is an enlarged fragmentary sectional view of parts shown in FIG. 2 to illustrate details more clearly;

FIG. 2B is an enlarged fragmentary sectional view of parts embodied in FIG. 2;

FIG. 3 is a transverse vertical sectional view taken at line 3—3 of FIG. 1, certain of the parts being broken away and in section to illustrate details more clearly;

FIG. 3A is an enlarged fragmentary sectional view of parts shown in FIG. 3 to illustrate details more clearly;

DESCRIPTION OF THE PREFERRED EMBODIMENT

Figure 4:
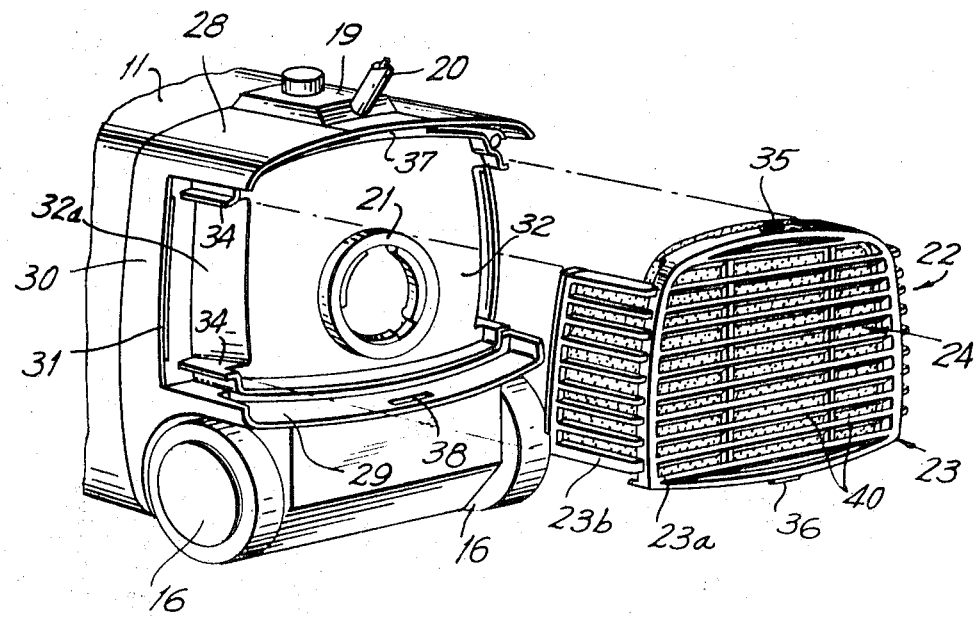
FIG. 4 is a fragmentary perspective exploded view of parts shown in FIG. 1.

Referring to FIG. 1, the invention has been shown applied to a horizontal tank-type suction cleaner comprising a casing 10 which includes a main body 11, a front end cover 12, and a rear end cover 14. The casing 10 is provided with a handle 15 and has wheels 16 to facilitate movement thereof on a supporting surface.

The front end cover 12, which is removably secured to one end of the body 11 in any suitable manner, is provided with an inlet 17 to which a flexible suction hose (not shown may be removably connected in a well known manner. The rear end cover 14 may be removably mounted in any suitable manner (not shown) to the opposite end of the body 11.

During operation of the suction cleaner dust-laden air is drawn into the casing through the air inlet 17 by a suitable motor-fan unit 18 disposed in the body 11. The motor-fan unit 18 is connected in an electrical circuit which includes a switch 19 and an electrical supply line 20 adapted to be connected to an electrical source of supply. Dirt entrained in air drawn into the inlet 17 is separated from air when it passes through a dust collecting member 21a, and air from which dirt has been removed is discharged from the casing 10 through an opening 21 in the rear end cover 14.

A suction cleaner accessory is often detachably connected to the air discharge opening 21 of the cleaner. The accessory may be a hose, or a spraying device which is connected to one end of the hose, the opposite end of which is connected to the air discharge opening 21. Such accessories are usually provided with fittings which are of a kind well known in the art and enable them to be detachably connected to the opening 21.

In accordance with this invention a combined filter and diffuser unit 22 is provided at the rear end cover 14. The filter and diffuser unit 22 comprises a U-shaped grate 23 having an end 23a which extends transversely of the cleaner and spaced apart sides 23b at opposing sides of the cleaner which extends from the end 23a toward the air inlet end 17 of the cleaner.

A filter 24 in the form of a layer of material like soft foamed plastic, for example, conforms to the shape of the U-shaped grate 23 and is disposed within the grate. The filter layer 24 includes a center section 24a which has the same shape as the end 23a of the grate 23 and fits within such grate end. The filter layer 24 is bent along fold lines 24b to provide sides 24c which bear against the inner faces of the spaced apart sides 23b of the grate 23.

A reinforcing member 25 is removably held at the inner face of the filter layer 24 to hold the outer face thereof against the grate 23. The member 25 is in the form of a frame which is open to allow air to pass therethrough and includes a small imperforate center section 25a having slots or openings 25b at the spaced vertical edges thereof. The end 23a of the grate 23 is provided with a pair of hooks 26 which pass through small openings 27 in the filter layer 24 and are removably held in the slots 25b.

The rear end cover 14 of the casing 10 includes top and bottom walls 28 and 29 and opposing exterior vertical side walls 30 which are notched and cut away at 31, as best seen in FIG. 4. The air outlet 21 is provided in a transverse wall or partition 32 of the rear end cover 14. The wall 32 includes side portions 32a which extend toward the front end cover 12 from the vertical plane of the air outlet 21. The side portions 32a of the transverse wall 32 extend axially of the casing 10 at the notched portions 31 of the side walls 30 and are separated from the latter by gaps 33, as seen in FIG. 3.

Figure 5:
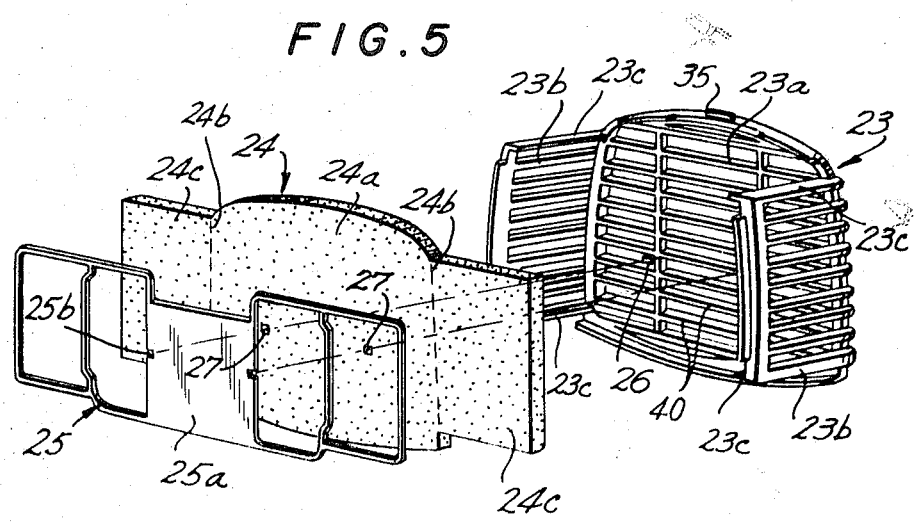
FIG. 5 is a fragmentary perspective exploded view of parts shown in FIGS. 1 and 5.

Axially extending guideways 34 are provided at the side portions 32a of the transverse wall 32. As best seen in FIG. 5, the tops and bottoms of the spaced apart sides 23b of the grate 23 are formed with inturned flanges 23c which respectively slide over the top and bottom surfaces of the upper and lower guideways 34.

The top and bottom edges of the end 23a of the grate 23 are provided with lips 35 and 36, respectively. The top and bottom walls 28 and 29 of the rear end cover 14 extend axially of the casing and terminate at regions removed from the transverse wall 32, as seen in FIG. 2. The inner surfaces of the ends of the top and bottom walls 28 and 29 are respectively recessed at 37 and 38 to receive and removably hold the lips 35 and 36 of the grate 23, as best shown in FIGS. 2A and 2B.

In FIG. 4 it will be seen that the top and bottom edges of the end 23a of the grate 23 are concave and slide between the convex inner surfaces of the top and bottom walls 28 and 29. When the filter and diffuser unit 22 is in its operative position and the sides 23b of the grate 23 are seated in the notched portions 31 of the side walls 30, a diffusion chamber 39 is formed which is defined by the U-shaped filter and diffuser unit 22 and the transverse wall 32 with its axially extending side portions 32a.

The filter and diffuser unit 22 functions to remove fine dust particles from air discharged and emerging from the opening 21. During normal operation of the cleaner a stream of air emerges through the opening 21 at a relatively high velocity. The stream of air is directed generally toward the small imperforate center section 25a of the reinforcing member 25 in a direction substantially perpendicular thereto.

The filter layer 24 has an overall cross-sectional area that is materially greater than that of the opening 21, whereby the air is subdivided into a multiplicity of tiny air streams which are discharged from the outer face of the filter and diffuser unit 23. In this way the velocity of the air discharged from the cleaner is reduced so that settled dust in the vicinity of the cleaner will not be disturbed. That portion of the stream of air emerging from the opening 21 and striking the imperforate section 25a of the reinforcing member 25 functions to spread the air in all directions within the diffusion chamber 39, whereby the tiny air streams pass through the filter layer 24 not only at the end 24a but also the sides 24c.

The grate 23 is provided with horizontally extending vanes 40 which are equally spaced from one another and inclined at an angle of 180° to the horizontal, whereby the tiny air streams emerging from the outer face of the filter layer 24 pass between the vanes and are deflected upward through a wide angle about the entire U-shaped filter and diffuser unit 22. It will be seen that the air is discharged from the chamber 39 through a horizontal arc which extends transversely of the cleaner at the vicinity of the air outlet end thereof and also along the opposing sides of the cleaner.

The three sided filter layer 24, which has an exceptionally large cross-sectional area, extends across the full width of the cleaner and then axially therefrom toward the air inlet 17 and terminates at a zone between the air inlet 17 and air outlet 21. With this construction the filter layer 24 effectively functions as a silencer by absorbing noise.

When the filter and diffuser unit 22 is removed from the rear end cover 14, a hose having a suitable fitting at the end thereof may be connected to the rear end cover at the air outlet 21. When there no longer is any need to use the hose, it can be removed from the rear end cover 14 and the U-shaped filter and diffuser unit 22 again can be removably mounted or positioned on the rear end cover 14.

I claim:

1. A horizontal tank-type suction cleaner comprising
   (a) an elongated casing defining a path of flow for air and having an inlet and outlet for air at opposite ends thereof, respectively,
   (b) dirt collecting means and air moving means in said casing, said dirt collecting means being nearer to said inlet and said air moving means being nearer to said outlet,
   (c) said casing including spaced apart exterior vertical side walls having notched regions at the air outlet end of said casing to form cavities with indented side wall sections which are nearer to one another than said exterior vertical side walls and extend axially of said casing in a direction from said air inlet end thereof and at their ends are connected by a transverse partition having an opening defining said air outlet,
   (d) the air outlet end of said casing including top and bottom walls having a vertical gap therebetween and extending axially of said casing from said partition in the direction air is discharged from said outlet, the top and bottom walls being adjacent to the tops and bottoms, respectively, of said indented side wall sections and extending transversely of said casing between the exterior vertical side walls thereof,
   (e) a U-shaped grate having an end and spaced arms extending therefrom,
   (f) means for detachably mounting said grate at the air outlet end of said casing with said end and arms thereof forming exterior walls of said casing, said grate in its mounted position having said arms thereof in the planes of said exterior side walls and spaced from and overlying said indented side wall sections at the notched regions of said exterior side walls and said end thereof spaced from and overlying said partition and bridging the vertical gap between said top and bottom walls and extending transversely of said casing between the exterior side walls thereof,
   (g) a filter comprising a layer of material which is permeable to air, said filter having a closed end and spaced arms extending therefrom, said filter conforming to the U-shape of said grate and being disposed therein at its inner face, and (h) said air outlet in said partition being accessible for detachably connecting a suction cleaner accessory thereto when said grate, together with said filter at its inner face, is removed from its mounted position at the air outlet end of said casing.

2. A suction cleaner as set forth in claim 1 in which said detachable mounting means comprises cooperating parts at the notched regions of said exterior side walls and the arms of said U-shaped grate, respectively, which function to enable said U-shaped grate to be moved axially to and from its mounted position at the air outlet end of said casing.

References Cited

UNITED STATES PATENTS

| 1,765,784 | 6/1930 | Aldinger | 15—326 |
| 2,096,883 | 10/1937 | Clason | 15—327 E UX |
| 3,172,743 | 3/1965 | Kowalewski | 55—472 |

FOREIGN PATENTS

| 203,803 | 4/1966 | Sweden | 15—326 |

WALTER A. SCHEEL, Primary Examiner

C. K. MOORE, Assistant Examiner

U.S. Cl. X.R.

15—326, 347; 55—350, 357, 372, 414, 471, 482, 491, 500, 509